No. 729,047. PATENTED MAY 26, 1903.
W. F. DRAPER.
CLAMPING DEVICE FOR HEDDLE BARS OR SUPPORTS.
APPLICATION FILED OCT. 10, 1902.
NO MODEL.
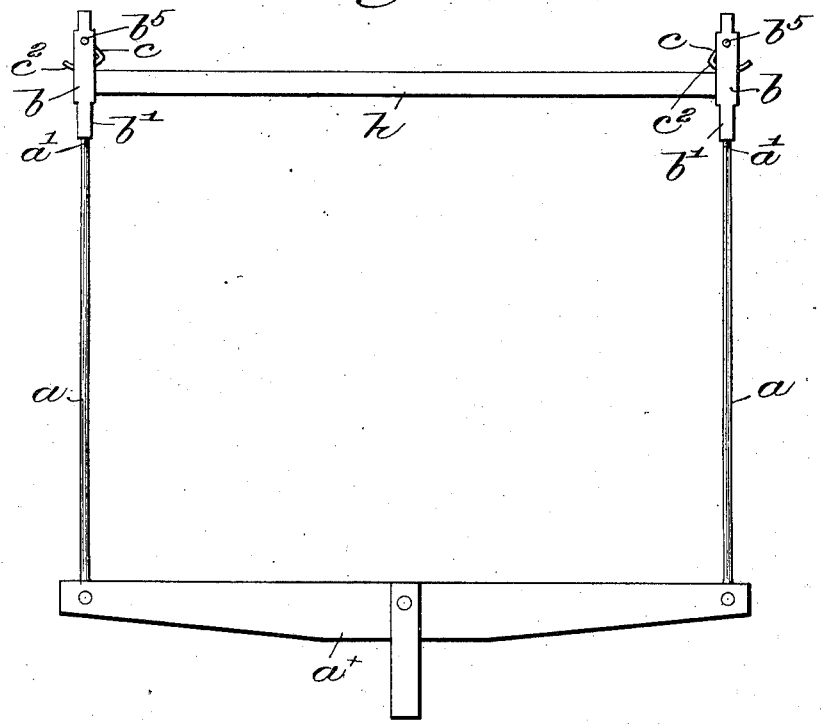
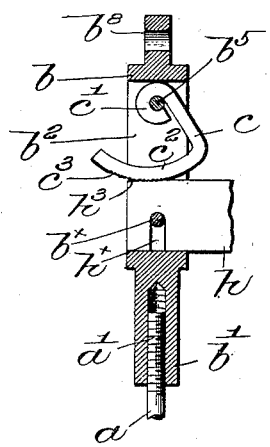 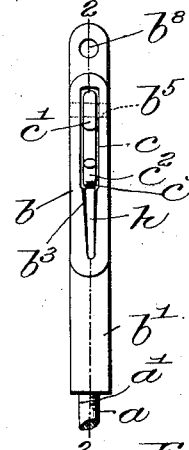 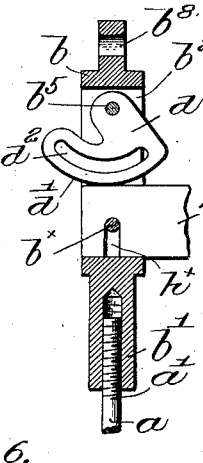 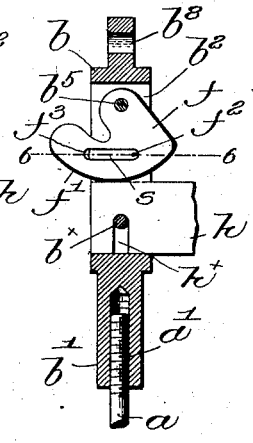
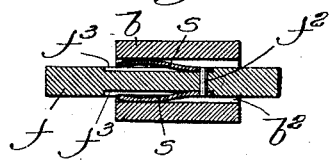

No. 729,047. Patented May 26, 1903.

UNITED STATES PATENT OFFICE.

WILLIAM F. DRAPER, OF HOPEDALE, MASSACHUSETTS, ASSIGNOR TO DRAPER COMPANY, OF HOPEDALE, MASSACHUSETTS, A CORPORATION OF MAINE.

CLAMPING DEVICE FOR HEDDLE BARS OR SUPPORTS.

SPECIFICATION forming part of Letters Patent No. 729,047, dated May 26, 1903.

Application filed October 10, 1902. Serial No. 126,661. (No model.)

*To all whom it may concern:*

Be it known that I, WILLIAM F. DRAPER, a citizen of the United States, and a resident of Hopedale, county of Worcester, State of Massachusetts, have invented an Improvement in Clamping Devices for Heddle Bars or Supports, of which the following description, in connection with the accompanying drawings, is a specification, like letters on the drawings representing like parts.

This invention relates to harness-frames for looms, and more particularly to the type wherein the heddles also serve as warp-stop-motion-controlling detectors; and it has for its object the production of novel, simple, and effective means for locking in place the detachable harness or heddle-support. The latter is made detachable in order that it may be readily removed or applied, as when a new warp-beam is placed in the loom, so that the harness-frame itself is not changed, and when for any reason one or more heddles must be removed from or placed upon the support.

The various novel features of my invention will be described hereinafter and particularly pointed out in the following claims.

Figure 1 is a front elevation of a harness-frame with one embodiment of my invention applied thereto. Fig. 2 is an enlarged longitudinal section, on the line 2 2, Fig. 3, of one of the heads of the side bars, showing the heddle-support retained in position by the locking device partly illustrated in Fig. 1. Fig. 3 is an outer end elevation of the head. Figs. 4 and 5 are enlarged sectional details similar to Fig. 2, but showing modified forms of the locking member; and Fig. 6 is a horizontal section, enlarged, on the line 6 6, Fig. 5.

Referring to Fig. 1, the bottom cross-bar $a^\times$ of the harness-frame has secured to it the upright side bars $a$, shown as rods, threaded at their upper ends at $a'$ to enter depending threaded bosses $b'$ of heads $b$, the latter being preferably made as castings. Each head has a longitudinal slot $b^2$ extended therethrough, reduced in width at its lower portion at $b^3$ to form a seat, its walls being shown slightly convergent in Fig. 3 toward the bottom of the seat. A transverse lug or bar $b^\times$ crosses the seat for a purpose to be described. The heddle-support $h$, shown as a flat bar, has a notch $h^\times$ in its lower edge near each end to embrace the lug or bar $b^\times$ when the ends of the support are inserted in the seats $b^3$. This prevents any relative lateral movement of the side bars of the frame and the heddle-support when the latter is in position. The support is applied by inserting its ends in the slots $b^2$ of the heads, and then it is pushed down into the seats $b^3$, the notches $h^\times$ engaging the lugs $b^\times$.

It is necessary to hold the support $h$ down in its seats during the shedding operation, and to this end I have provided each head with a locking member which is movable into position to engage the heddle-support and retain it seated. Referring to Figs. 2 and 3, the locking device is shown as a piece of strong spring-wire $c$, having an eye $c'$ at its upper end to receive a pivot-pin $b^5$, extended through the head at the upper end of the slot $b^2$. The lower end of the wire $c$ is bent into a curved arm $c^2$, eccentric to the pivot-pin, the cam-face thus presented being adapted to engage and bear upon the top of the heddle-support $h$. By pushing the locking member farther into the slot of the head the more firmly is the support retained in its seat, the resiliency of the locking member preventing its accidental release, the point of contact between the cam-face and the top of the support being practically directly beneath the fulcrum of the locking member. The grip of the latter may be increased by serrating the top edge of the support $h$, as at $h^3$, Fig. 2, and similarly serrating the lower side of the curved arm $c^2$, as at $c^3$.

A modified form of locking member is shown in Fig 4, said member being made as a segmental plate $d$, preferably of steel, having a curved face $d'$ eccentric to its fulcrum-pin $b^5$, on which latter the plate is mounted in the slot of the head. In order to increase the spring or resiliency of the plate, it is shown as made with a segmental slot $d^2$ parallel to and near the cam-face $d'$.

The mode of operation of the locking member will be obvious from the foregoing.

To release the heddle-support in either of the structures described, the locking member is swung inward, the eccentricity of the cam-face being so formed, and the support $h$ can then be lifted out of the seats and removed from the heads by longitudinal movement.

Yet another modification is shown in Figs. 5 and 6, the locking member $f$ being made as a solid plate having an eccentric or cam face $f'$, and to prevent accidental release of the heddle-support I have shown leaf-springs $s$, Fig. 6, secured to opposite sides of the member $f$ by a pin or rivet $f^2$ and bearing on the front and back walls of the slot in the head, the springs being seated in recesses $f^3$ in the opposite faces of the members $f$. (See Fig. 6.) This spring action takes the place of the resiliency of the locking members shown in Figs. 1 to 4, inclusive, and permits the member $f$ to be made solid, and it may be a casting, if desired.

The heads $b$ have eyes $b^8$ at their upper ends to receive the overhead suspending members for the harness-frames.

The outer end of the locking member is preferably made long enough to project beyond the outer face of the head, so that the attendant can readily move it into inoperative position by a tap or blow when it is desired to release the heddle-support.

My invention may be changed or modified in various particulars by those skilled in the art without departing from the spirit and scope of my invention, several practical embodiments thereof being herein shown and described.

Having described my invention, what I claim as new, and desire to secure by Letters Patent, is—

1. In a loom-harness frame, side bars having longitudinally-slotted heads, a detachable heddle-support adapted to be seated in the slotted heads, and a locking-cam on each head to engage and retain the heddle-support in position.

2. In a loom-harness frame, side bars having longitudinally-slotted heads, a detachable heddle-support adapted to be seated in the slotted heads, and a locking member pivotally mounted on each head, to engage and press upon the edge of and retain the heddle-support in position.

3. In a loom-harness frame, side bars having longitudinally-slotted heads, a detachable heddle-support adapted to be seated in the slotted heads, and a locking member pivotally mounted in the upper end of each slot and having a cam-face, to engage the top of the heddle-support and retain it seated in the bottom of the slots.

4. In a loom-harness frame, side bars having longitudinally-slotted heads, a detachable heddle-support adapted to be seated in the slotted heads, means to prevent lateral movement of the heads when the heddle-support is in place, and a cam-like locking member movably mounted on each head, to engage the top of the heddle-support and maintain it seated.

5. In a loom-harness frame, side bars having heads provided with longitudinal slots reduced in width at their lower ends to form seats, a detachable heddle-support adapted to enter the seats and be positioned thereby, and a locking member movably mounted on each head and provided with a cam-face, to engage the top of the heddle-support and retain it in the seats of the heads.

6. In a loom-harness frame, side bars having longitudinally-slotted heads to receive the ends of the heddle-support, the heddle-support, a pivotally-mounted locking-cam in the upper end of each slot, to engage the top of and retain the heddle-support seated, and yielding means to prevent accidental release of the locking-cams.

7. In a loom-harness frame, side bars having longitudinally-slotted heads to receive the ends of the heddle-support, the heddle-support, and a resilient locking-cam pivotally mounted on each head, to engage the top of the heddle-support and retain it seated in the bottoms of the slots.

In testimony whereof I have signed my name to this specification in the presence of two subscribing witnesses.

WILLIAM F. DRAPER.

Witnesses:
GEORGE OTIS DRAPER,
ERNEST WARREN WOOD.